United States Patent Office 3,696,059
Patented Oct. 3, 1972

3,696,059
PROCESS FOR PREPARING OLEFIN POLYMER FOAMS
Kirokuro Hosoda, Kanagawa-ken, Naonori Shiina and Yoshio Kadowaki, Tokyo, and Hiroyuki Nakae, Kanagawa-ken, Japan, assignors to The Furukawa Electric Company Limited, Tokyo, Japan
Filed June 5, 1969, Ser. No. 830,816
Claims priority, application Japan, June 13, 1968, 43/40,794
Int. Cl. C08f 47/10, 29/12; C08d 13/10
U.S. Cl. 260—2.5 HA  25 Claims

ABSTRACT OF THE DISCLOSURE

This invention provides a process for preparing olefin polymer foams by heating to cause foaming of a composition consisting of olefin polymers, polybutadiene and a foaming agent. The product of this invention is a white and uniform foam including a number of independent cells and the product olefin polymer foam combines the excellent characteristics of both the olefin polymer and the polybutadiene.

---

The present invention relates to a process for preparing foams of an olefin polymer composition. More particularly, this invention relates to a process for producing foams characterized by heating a composition which consists of 99.5–70% of an olefin polymer, 0.5–30% polybutadiene and a foaming agent, and provides a commercially useful process for preparing polyolefin foams.

Since olefin polymers exhibit relatively low viscoelasticity at a high temperature, they hardly produce highly foaming matters when heated in the presence of a foaming agent. For that reason, in the usual process for preparing highly foaming olefin polymers an additional crosslinking process is required in order to bring the olefin polymers to a visco-elastic state suitable for foaming.

One process for that purpose as a well known technique employs chemical cross-linking agents. For example, in a process for preparing polyethylene foams, at first inter-molecular cross-linkage is produced in polyethylene by adding a cross-linking agent such as organic peroxides which, when heated, produce radicals to form cross-linkage in the polyethylene, and of which an example is dicumyl peroxide (hereinafter designated as D.C.P.), and subsequently the foaming agent is decomposed to produce desired foams. The generally adopted process is as follows: the admixed and molded composition consisting of low density polyethylene, cross-linking agent (D.C.P.) and foaming agent (azodicarbonamide, for example) is heated to cause foaming. The disadvantages of this process are that the cross-linking agent is expensive and requires deliberate handling, and that the processes in which the cross-linking agent is added and then decomposed by heating necessarily make the working conditions and the apparatus more complicated, hence the cost higher. For high density polyethylene to be used, a larger amount of cross-linking agent is needed. D.C.P. is almost the only cross-linking agent commercially available for polyethylene for the industrial purpose, and the most suitable working temperature for low density polyethylene is usually in the range 170–200° C.; but when D.C.P. is used, the working temperature should be maintained in the range 110–135° C. in order not to induce substantial decomposition of D.C.P. during admixing and molding. So that precise control of temperature is required, also sacrificing the working efficiency. The high density polyethylene, which cannot be processed in practice below 135° C., hardly produces chemically crosslinked foams.

In the known process for preparing, for example, polypropylene foams, in which polypropylene is cross-linked and brought to foaming by use of the azide cross-linking agent and a foaming agent, the azide cross-linking agent is very expensive and requires careful handling. Since the decomposition of azide cross-linking agents generally takes place at a temperature close to the melting point of polypropylene, an extremely precise temperature control is required so as not to cause decomposition of the azide cross-linking agent at the stage of admixing and molding, therefore it is difficult in practice to conduct efficiently such process as admixing and molding through an extruding machine.

One of other known techniques employs irridation of radiation, though it requires an expensive irradiation apparatus and its handling is restricted because of danger to human bodies. This method is useful for thin sheet of low density polyethylene, but disadvantageous in that the degree of cross-linkage decreases with the increase of depth from the surface. In addition degradation of polypropylene proceeds while being irradiated, so that this method cannot be employed to produce polypropylene foams.

The present inventors, after scrutinizing various processes for producing olefin polymer foams, have arrived at a process entirely different from the conventional methods, by which process olefin polymer foams can be produced efficiently and steadily merely by adding 0.5–30% polybutadiene to the olefin polymer without cross-linking the olefin polymer, and foams thus produced have very excellent characteristics, so that wide uses thereof can be expected. Further, the merit of this process in the industrial application is very large because of its simple operation that does not require expensive additives, apparatus and processes.

A process for preparing foams by adding rubbers to olefin polymers is disclosed in the British Pat. No. 524,063 which describes that a foam can be obtained from low density polyethylene by adding to it any of the members consisting of natural rubber, hydrogenated natural rubber, polymers or copolymers of butadiene, gutta-percha and polyisobutylene. Also a process is shown in the patent in which inorganic foaming agents are employed, where heating is peformed in the temperature range from the melting point of polyethylene up to the higher temperature by 20° C.

In addition, Japanese Patent Publication Sho 41–12631 describes that low density foams can be obtained by adding to an olefin polymer 10–50% of a styrene-butadiene copolymer of which the styrene content is 10–60%. It is stated that the existence of benzene rings in the molecular structure of the rubber to be added as a necessary condition because the accomplishment is the result of the improved viscoelasticity of the melt of the olefin polymer owing to the large attractive force between benzene rings and the steric hindrance thereof. In spite of many advantages of this process, the products are colored and smell bad, and low in weather resistance and heat aging.

Entirely different from the piror arts described above, the present invention can provide excellent foams of olefin polymers which include both high and low density polyethylenes and polypropylene merely by using polybutadiene, in which there is no polar group that exhibits strong intermolceular attraction like that of benzene rings.

In other words, this invention provides a process for preparing olefin polymer foams by heating to induce foaming of a composition consisting of an olefin polymer, polybutadiene and a foaming agent. The product of this invention is a white and uniform foam with a number of independent cells and the product olefin polymer foam has peculiar characteristics of combining the excellent properties of olefin polymers and polybutadiene. That is, the improved properties involve antishock property, low temperature charatceristics, and mechanical strength chiefly due to the sandwich-structure consisting of hard outside shell and a highly developed inside structure. Thus, the present invention is based on a technical concept entirely different from the above cited British Pat. No. 524,063 and the Japanese patent publication Sho 41–12631. More particularly, this invention provides highly developed foams containing uniformly distributed tiny polyhedral cells in a wide temperature range merely by adding a small amount, for instance 3%, of polybutadiene. This outstanding advantage cannot be expected from the foregoing techniques.

In general, the formation of foams proceeds as follows: tiny particles of a foaming agent which is dispersed in the polymer melt are decomposed at a temperature above the decomposition temperature of the foaming agent to generate gas and thence tiny bubbles are formed. The pressure of gas within bubbles is supposed to be over several hundred atmospheres, so that very rapid expansion takes place. If the polymer matter can stand the expansion, highly developed foams having polyhedral cell structure will probably result. Success depends mostly on the viscoelasticity of the polymer melt.

The effect achieved by addition of a styrene-butadiene copolymer as mentioned above is presumably due to the increased viscosity, which results firstly from large mutual attraction of benzene rings of the copolymer and secondly from less easy liberation of entangled molecules owing to the steric hindrance of benzene rings, and the increased elasticity due to the high molecular weight rubber substance added in a large amount.

The mechanism of the effect in the present invention is quite different from the above. The electron-microscopic observation revealed that polybutadiene is dispersed in the olefin polymer medium as particles in the order of about 0.1–1.0 micron. The chain of polybutadiene molecules is much more capable of bending in comparison with other rubbers, because the polybutadiene contains a number of double bonds and at the same time lacks of side chains. As the result, entanglement of molecular chains of polybutadiene and olefin polymer, or physical crosslinkage between them, is especially predominant at the surfaces of dispersed polybutadiene particles, therefore a small amount of butadiene added acts to improve the viscoelasticity of the composition in the molten state so that it stands rapid expansion of gas generated from the foaming agent. Thus highly developed foams are more easily produced by the presence of polybutadiene.

A difference of this invention from the British Pat. No. 524,063 is the temperature at which to operate the process. Thus, the present invention can be conducted at a higher temperature (therefore with a high efficiency of molding) and moreover the temperature of foaming can be selected in a wider range. For example, when decomposing a foaming agent and low density polyethylene the prefered temperature of foaming in this invention may be arbitrarily selected from temperatures higher by 20–120° C. over the melting point of the olefin polymer, while in the British patent the temperature should be in the range which is higher than the melting point of the olefin polymer by 0–20° C.

The favorable effect achieved by adding polybutadiene as above can never be obtained even if natural rubber, hydrogenated natural rubber, polyisobutylene, butyl rubber or ethylene-propylene rubber are admixed with the polymer. As is evident from the examples, it becomes possible to prepare highly developed foams only when polybutadiene is added.

Notworthy is the fact that addition of polybutadiene in the amount less than 10% can fully exhibit the effect and a highly foamable composition is obtained.

Olefin polymers used in the present invention include, for example, high density polyethylene, low density polyethylene, ethylene-vinylacetate copolymers, ethylene-acrylate copolymers, ethylene-acrylic acid copolymers, ethylene-propylene copolymers, ethylene-butene copolymers, chlorinated polyethylene, chlorosulfonated polyethylene, polypropylene, polypropylene copolymers, chlorinated polypropylene, polybutene and copolymers thereof, ionommers with ethylene or propylene as major constituent and poly-4-methylpentene-1, and imply one of them or a mixture of more than two of them.

There is not any restriction to the polybutadiene employed in this invention. It may be prepared using any of the following polymerization procedures: radical, alfine, cationic, anionic and coordinated anionic polymerizations. This includes, for example, poly-cis-butadiene polymerized by a Ziegler catalyst and polybutadiene polymerized an alkyllithium catalyst. Also copolymerized products of butadiene with styrene, α-methylstyrene, vinylpyridine, vinyl acetate, vinylidene chloride, acrylic acid, methacrylic acid, chloroprene, isoprene and isobutylene which contain less than 10% of copolymerization and which may be substantially regarded as polybutadiene, and partly hydrogenated polybutadiene rubbers are included in the mentioned polybutadienes. The polybutadiene of this invention may be either a single substance or a mixture of two or more substances and the molecular weight, though not especially limited, should be in the range about 5,000–500,000, preferably about 50,000–400,000.

The percentage of polybutadiene to be added should be decided depending on the desired properties and the use of the olefin polymer foams, and there should be some allowance in the percentage owing to the variety of olefin polymers and the molecular weight thereof, the chemical structures of the polybutadienes and the molecular weight thereof, the decomposition temperatures of the foaming agents used and the working process and the conditions. The usual percentage is approximately 0.5–30% by weight, preferably 1–10% by weight, relative to the total weight of polyolefin and polybutadiene (the same expression holds hereinafter). Generally, the larger the molecular weight of the olefin polymer used, the smaller the amount of polybutadiene required. For an olefin polymer of considerably large molecular weight, an addition of as small as 0.5% suffices to obtain favorable effect, and in these cases the foam products are particularly superior in mechanical strength. On the contrary, if the amount of polybutadiene exceeds 30%, particles of polybutadiene are combined to form a continuous phase, which results in deteriorated mechanical strength and weathering resistance. The polybutadiene or butadiene copolymers of the present invention preferably have a cis-content of at least 35%.

Chemical foaming agents which are decomposed to produce gas when heated may be used in this invention. Among them, organic foaming agents belong to such compounds as nitroso, aromatic hydrazide and azo compounds. They include, for example, azodicarbonamide, diazominoazobenzene, dinitrosopentamethylenetetramine, N,N' - dimethyl-N,N'-dinitrosoterephthalamide, P,P'-oxybis(benzenesulfonylsemicarbazide), azo - bis(isobutylonitrile), toluenesulfonylsemicarbazide, P,P'-oxy-bis(benzenesulfonylhydrazide), P,P'-diphenyl-bis(sulfonylhydrazide), toluenesulfonylhydrazide, benzenesulfonylhydrazide, and m - benzene - bis(sulfonylhydrazide). Also employed are inorganic compounds for the same purpose such as sodium bicarbonate, sodium carbonate, ammonium bicarbonate, ammonium carbonate, ammonium chloride, ammonium nitrate and sodium nitrate. Foaming assistants of various kinds, for example urea, may also be used along with the above-mentioned agents.

In this invention, volatile foaming agents and inert gases may be used. They may be either a single substance or a mixture of two or more substances selected from the group consisting of monochlorotrifluoromethane, dichlorodifluoromethane, monochlorodifluoromethane, 1,2-dichlorotetrafluoroethane, trichloroethylene, isobutane, methylchloride, chloroform, carbontetrachloride, trifluoroethane, octafluorocyclobutane, perfluoropropane, 2,2-difluoropropane, ethylidenefluoride, pentane, hexane, butane, propane, $N_2$ and $CO_2$.

The amount of foaming agents to be added is quite differently dependently on the species thereof and other factors. The process of this invention usually produces foams having a density between 0.5 and 0.02 g./cc.

In this invention, a small amount of water may be added to the composition. That is, the added water, 0.3-3% by weight relative to the polymer materials, will be evaporated at the time of expansion to remove sufficient latent heat to stabilize the cell walls. Therefore the foam contains uniformly dispersed tiny cells. Water should be added in such manner as to wet the ingredient powders, or introduced with liquid foaming agent into the extruder under a pressure.

To increase the number of nuclei in this invention, such materials are sometimes added to the composition as zinc oxide, talc, titanium white, silicates, diatomaceous earth, calcium carbonate and aliphatic acid salts such as zinc stearate and aluminum stearate. Furthermore, additives of ordinary use, such as reinforcing agent, filler, bulking agent, thermal or photostabilizer, flame preventor, dye, pigment and lubricant, may also be added.

Any conventional mixing process may be applied to this invention in mixing with the olefin polymer polybutadiene, foaming agents and additives. More particularly, the materials may be mixed with the aid of a roll-mill, a Banbury's mixer, a screw extruder, a Henschel's mill and a whirling mixer.

The olefin polymer foam material of this invention can be prepared, for example, by extruding with an extruder from the high pressure region to the low pressure region, being accompanied by simultaneous foaming, successively to form rods, planks or sheet films of the foam material. Other processes to prepare the foam material by molding include a process involving a blow molder or an injection molder, a process to cause foaming by heating the composition under normal pressure, a process to cause foaming by releasing pressure from a material which has been heated under pressure, and the so-called mold-foaming in which a foam product is manufactured by heating the composition in a closed but not strictly air-tight vessel.

In the mold-forming, the composition is preferably applied in pieces, that is in pellets, flakes or beads which are in accordance with the feature of this invention, and thereby complexly shaped molded foams of olefin polymers of high strength can be produced with a relatively simple apparatus. Moreover, the products have a very smooth surface, because particles of the composition melt to combine with each other, owing to the absence of cross-linking agent, so as to make the boundaries between them indistinguishable.

Another feature of the mold-foaming mentioned above is the sandwich structure of the foam products consisting of structures of the highly foamed interior and the hard outer shell. The foam products of sandwich structure thus prepared are excellent in mechanical properties such as resistance to scratch strength, compression strength, and water, and due to the foam structure of the bulk they are light in weight and have good shock resistance; therefore they are suited for light weight structural material.

According to the present invention, olefin polymer compositions can be heated under a high pressure so as to decompose the foaming agent, and extruded in the low pressure region to cause foaming successively with ease. Since foaming can be made much easier by adding only a small amount of polybutadiene as is evident in the examples, the advantages of this invention are certified that the fluidity of materials is changed very little and hence the extrusion characteristic is not lowered.

The features of the present invention can be summarized as follows:

(1) Olefin polymer foams can be prepared with ease from any of olefin polymers such as polypropylene, high density polyethylene, low density polyethylene, and ethylenevinyl acetate copolymers. For example, whereas the previous processes could not get rid of various technical difficulties as described before with polypropylene and high density polyethylene, the present invention has succeeded in eliminating all of them and can provide an efficient and inexpensive process for preparing foams of polypropylene and high density polyethylene.

(2) Since the process of this invention does not require any cross-linking agent, no special equipments or process are needed, which ensures low cost production.

(3) Owing to the improved visco-elasticity, resulting from addition of polybutadiene, the foaming process can be conducted in a wide range of temperatures with good results, therefore the most efficient process for production and the most favourable conditions can be selected.

(4) Since no cross-linking agent is used and cross-linkage is not applied in the polymers, a highly-efficient continuous direct foaming is made possible by employing an extruder, an injection molder, and a blow molder.

(5) Surprisingly, a small rate of added polybutadiene, that is 1%, can improve the visco-elasticity to bring about the most favourable foaming effects, and the least deterioration of the fluidity of olefin polymer. Therefore, the process can be applied with success to any of the following processes: preparation of planks and sheets by extrusion foaming, preparation of slabs by pressing, wire cores, preparation of various foams of various shapes, by injection of blow foaming.

(6) According to the present invention, a suitable amount of the compositions consisting of an olefin polymer, polybutadiene and a foaming agent, which are prepared in chips, pellets, beads or flakes, are heated to cause foaming in a closable but not strictly air-tight mold of a desired shape, to obtain molded olefin polymer foams, in which surfaces of the beads, chips, pellets or flakes melt tightly together so that the interfaces are not distinguishable.

(7) In the present invention, molded olfin polymer foams can be produced in which the outside is covered uniformly with very strong thick shells by choosing proper foaming conditions. The molded foams of double structures thus obtained, consisting of a highly foamed interior and the outer shells having the least foamed structure, are characterized by exceeding strength and moderate elasticity. Therefore they are use as materials for floats for fishery and parts for the safeguard of automobiles for example, which require light-weight and strength, and as materials for flooring and benches to sit on, which require adiabatic property as well as strength. They are suited for a wide range of applications, especially for light-weight structural materials. More particularly, rigidity against bending is the most important requirement for light-weight structural materials. The bending stress is generally miximum at the surfaces and becomes gradually smaller towards the inner axis, so that the most preferable one is a combination of materials of high strength as the surface material and an inner material which is light in weight and strongly stand the compression and shear at bending. The product of this invention is no doubt an ideal structural material satisfying the above requirements, and the mechanical properties thereof is stable enough and also an efficient production can be expected because it does not require process of adhesion between interior and surface materials.

(8) A cross-linked material cannot be treated repeatedly, but the materials worked by the process of this invention, which does not employ any cross-linking agent, can be recovered for reuse as raw materials for production of new forms.

The present invention will be explained referring to the following examples.

EXAMPLE 1

To high density polyethylene (having a melt index 0.5 and a density of 0.96 g./cm.$^3$), polybutadiene (having a cis-1,4 bonding content of over 98% and a Mooney viscosity of 35-48, designated hereinafter simply as polybutadiene) was added in the ratios shown in Table 1, and the mixture was milled for about 2 minutes with a roll mill kept at 140–145° C. on the surface. Then 5 parts by weight (hereinafter designated simply as parts all through the subsequent examples) of azodicarbonamide as foaming agent was added and the whole mixture was milled for about 15 minutes.

The resulting material was shaped in a plank of about 7 mm. thickness with a hot press of 140–145° C., then it was cut into pieces of about 40 x 40 mm. and each piece was wrapped in an aluminum foil and immersed for about 10 minutes in a 200° C. bath of Wood's metal to cause foaming. The apparent density of the foam product obtained as measured by the buoyancy method is listed in Table 1.

TABLE 1

| Composition (part) [1] | | | | |
|---|---|---|---|---|
| High density polyethylene | Polybutadiene | Azodicarbonamide | Density (g./cm.$^3$) | Thickness of the foams (mm.) |
| 100 | 0 | 5 | 0.43 | 8 |
| 99 | 1 | 5 | 0.20 | 19 |
| 98 | 2 | 5 | 0.15 | 27 |
| 97 | 3 | 5 | 0.12 | 26 |
| 96 | 4 | 5 | 0.11 | 28 |
| 95 | 5 | 5 | 0.10 | 30 |
| 90 | 10 | 5 | 0.11 | 31 |
| 100 | [2] 2 | 5 | 0.32 | 13 |

[1] Part by weight; and same meaning all through the subsequent tables.
[2] D.C.P.

Highly developed foam products were not produced from compositions in which the polybutadiene content is zero, and had rather large voids of nonuniform shapes. On the contrary, when polybutadiene was added a very highly developed foam product was prepared which contained independently existing cells of uniform polyhedral shape (about 0.5–1 mm. in diameter). Table 1 also shows the average thickness of the foam product obtained, the values meaning the degree of expansion in the direction of the thickness since the material planks were all 7 mm. thick. As is evident in the table, the effect of added polybutadiene, even in a small amount, is remarkable in making the product much thicker, but if otherwise almost no increase of thickness occurs. Table 1 also shows the result when D.C.P. was used instead of polybutadiene, and in this case the foam product contained more nonuniform and larger cells than when polybutadiene was added. For the sake of comparison, the process of production was applied to compositions, in which 10% of polyisobutylene (molecular weight about 100,000) or ethylenepropylene rubber (Mooney viscosity 30–40) was used in place of polybutadiene. The foam product of either case contained large and nonuniform voids and the density was 0.4–0.6 g./cm.$^3$, instead of highly developed foams.

EXAMPLE 2

The compositions shown in Table 2 consisting of high density polyethylene (melt index 0.5), polybutadiene described above and azodicarbonamide were each milled as in Example 1, and then about 2 mm. thick sheets were molded from them. They were cut into 30 x 30 mm. pieces and each was wrapped in an aluminum foil, and immersed in about 200° C. bath of Wood's metal in order to cause foaming. The density and the compression reflection of each product are listed in Table 2.

TABLE 2

| Composition (part) | | | | |
|---|---|---|---|---|
| High density polyethylene | Polybutadiene | Azodicarbonamide | Density (g./cm.$^3$) | Compression reflection at 25% refl. (kg./cm.$^2$) |
| 100 | 0 | 5 | 0.43 | |
| 90 | 10 | 5 | 0.11 | 4.3 |
| 80 | 20 | 5 | 0.11 | 3.6 |
| 70 | 30 | 5 | 0.12 | 3.0 |
| 60 | 40 | 5 | 0.15 | 1.4 |
| 30 | 70 | 5 | 0.45 | |

When no polybutadiene was added, almost no foaming occurred, but when polybutadiene was added, highly developed pure white and hard foam products were obtained which contained a number of polyhedral shaped cells having average diameter of about 0.5 mm.

Further, a product prepared by adding 40% polybutadiene is inferior in mechanical strength relative to that prepared by adding 30% polybutadiene.

EXAMPLE 3

A mixture consisting of 90 parts of high density polyethylene (melt index 0.5), 10 parts of polybutadiene and 7.5 parts of azodicarbonamide was milled for about 10 minutes with an open roll mill of the surface temperature 145° C., and the mixture was molded into a plank of 4 mm. thickness with a hot press. Small pieces thereof were wrapped in aluminum foils and heated by immersing them in about 195° C. glycerine bath to cause foaming. The product of density 0.07 g./cm.$^3$ contained independently existing tiny cells of uniformly shaped polyhedrons.

EXAMPLE 4

Low density polyethylene (melt index 1.0 and density 0.92 g./cm.$^3$) and polybutadiene were mixed in the proportions indicated in Table 3 and treated with a roll mill for about 5 minutes at 110–130° C.; then after addition of 5 parts of azodicarbonamide, the whole mixture was milled for 15 minutes. The composition was molded into about 2 mm. thick sheets with a hot press and then cut into 30 x 30 mm. pieces. They were wrapped in aluminum foils and heated by immersing them for 5 minutes in about 200° C. Wood's metal bath to cause foaming. The apparent densities and compression reflection of the foam products are shown in Table 3.

TABLE 3

| Composition (part) | | | | |
|---|---|---|---|---|
| Low density polyethylene | Polybutadiene | Azodicarbonamide | Density (g./cm.$^3$) | Compression reflection at 25% refl. (kg./cm.$^2$) |
| 100 | 0 | 5 | 0.41 | |
| 95 | 5 | 5 | 0.15 | 1.8 |
| 90 | 10 | 5 | 0.11 | 1.4 |
| 80 | 20 | 5 | 0.11 | 1.3 |
| 70 | 30 | 5 | 0.11 | 1.2 |
| 60 | 40 | 5 | 0.11 | 0.8 |
| 50 | 50 | 5 | 0.12 | 0.7 |
| 40 | 60 | 5 | 0.45 | |
| 30 | 70 | 5 | 0.45 | |
| 100 | [1] 1 | 5 | 0.10 | 1.2 |

[1] D.C.P.

When polybutadiene was not added, many voids existed in the polymer phase, which implied that the foam structure could not be maintained but the cells were broken. From a composition to which polybutadiene was added a pure white foam product containing uniformly shaped polyhedral cells of diameter less than 1 mm.

EXAMPLE 5

Isotactic polypropylene (melt index 1.3), different proportions of polybutadiene and azodicarbonamide were mixed in the proportions indicated in Table 4. They were milled at 165° C. in the same manner as in Example 4 and were heated to foam at 200° C. The results are shown in Table 4.

TABLE 4

| Composition (part) | | | | |
|---|---|---|---|---|
| Polypropylene | Polybutadiene | Azodicarbonamide | Density (g./cm.$^3$) | Compression reflection at 25% refl. (kg./cm.$^2$) |
| 100 | 0 | 5 | 0.38 | |
| 90 | 10 | 5 | 0.11 | 6.0 |
| 80 | 20 | 5 | 0.10 | 5.5 |
| 70 | 30 | 5 | 0.11 | 4.9 |
| 60 | 40 | 5 | 0.13 | 2.6 |
| 40 | 60 | 5 | 0.14 | 1.5 |
| 30 | 70 | 5 | 0.40 | |
| 100 | [1] 0.5 | 5 | 0.24 | 5.0 |

[1] NSA.

When polybutadiene was not added, a number of voids were found in the polymer phase which did not assume foamed structure. However, when polybutadiene was added, the effect was remarkable in that a highly developed foamed product was obtained containing uniformly shaped polyhedral cells.

If 1,9-nonon-bis(sulfoneazide) (NSA) is used as crosslinking agent in place of polybutadiene, a part of the agent is decomposed and colored while being milled with a roll mill, and the foamed product obtained was not so uniform as that obtained with polybutadiene added.

EXAMPLE 6

A mixture consisting of high density polyethylene (melt index 0.5), polybutadiene and azodicarbonamide in the proportions indicated in Table 5 was milled under the same condition as described in Example 1, and the obtained sheet was cut into flakes. About 35 g. of the above composition (several pieces of the flakes) was placed in an about 240 cc. aluminum mold for float, heated at about 190° C. with steam for about 20 minutes and then cooled. The density and appearance of the foamed product obtained are summarized in Table 5.

TABLE 5

| Composition (part) | | | Foamed product | |
|---|---|---|---|---|
| High density polyethylene | Polybutadiene | Azodicarbonamide | Density (g./cm.$^3$) | Appearance |
| 100 | 0 | 5 | | Many voids exist. No shell. |
| 99 | 1 | 5 | 0.27 | A small number of voids found. |
| 98 | 2 | 5 | 0.17 | |
| 97 | 3 | 5 | 0.16 | |
| 96 | 4 | 5 | 0.16 | Contains independent cells of polyhedral structure. Hard shell outside. |
| 95 | 5 | 5 | 0.14 | |
| 92 | 8 | 5 | 0.14 | |

The product from a composition containing no polybutadiene had many voids connected to each other and the density could not be measured by the buoyancy method, therefore the product can not be called a foamed product. On the contrary, a composition containing polybutadiene gave a foam product covered with 1 mm. thick hard shells of polyethylene and the inside was of soft foamed structure consisting of a number of independent cells of polyhedral shape. Also the flakes of the composition were bound so perfectly to each other that no defect was observed at the interface between the flakes.

For the sake of comparison, a composition containing 2% D.C.P. in place of polybutadiene was treated in the same manner. In the product obtained, interfaces between flakes could be distinctly observed perhaps due to insufficient expansion and the mutual combination of flakes was also insufficient.

To illustrate the effect of adding polybutadiene, two samples were prepared, one not containing polybutadiene (sample 1) and the other containing 5% polybutadiene (sample 2). In the case where polybutadiene was not added (sample 1), the foamed product contained large voids of a diameter of over 5 mm. making the foamed product of little or no commercial value. On the other hand, where polybutadiene was added, the foamed product contained uniformly shaped independent cells having a diameter of about 0.5–0.1 mm. wherein the outside is uniformly covered by a resin layer of about 1 mm. thickness, resulting in a foam product of satisfactory strength. This distinct difference proves that a foam product of excellent strength can be prepared only by adding polybutadiene.

For the sake of comparison, compositions containing 5% each of polyisobutylene (molecular weight about 100,000), ethylene-propylene rubber (Mooney viscosity 30–40), styrene-butadiene rubber (styrene content 40% Mooney viscosity 30–42), and butyl rubber (Mooney viscosity 70–89) were treated in the same manner, and the foam product in either case was found to have density 0.6–0.7 g./cm.$^3$ or to be insufficiently developed.

EXAMPLE 7

A mixture consisting of 95 parts of high density polyethylene (melt index 6.0), 5 parts of polybutadiene, 5 parts of azodicarbonamide and 2 parts of a urea series assistant foaming agent (Cellpaste K–5 supplied by Eiwa Kasei Co.) was milled for about 20 minutes with a roll mill of the surface temperature 132–137° C. and a sheet was produced from it, which was cut into pellet type pieces.

To make a vesel of the outside dimension 130 x 110 x 60 mm. with the wall thickness 10 mm., about 80 g. of the above pellets were placed in an aluminum metal mold, to which a silicon detaching agent had been applied, and heated for 45 minutes with steam at about 180° C., and then cooled. The foam product obtained was pure white with sufficient unitarization of pellets and was exactly in the shape of the mold, contraction being negible. The product also exhibited sufficient strength, in spite of lightweight, due to the sandwich structure consisting of a hard outside shell and a highly developed inside structure.

EXAMPLE 8

Compositions consisting of polypropylene (melt index 0.5), polybutadiene and azodicarbonamide in the proportions indicated in Table 6 were milled for about 15 minutes at 163–165° C. to make sheets, which were then made into pellets. The pellets were placed as in Example 6 in a metal mold for float and heated with steam for 20 minutes at 190° C. to cause foaming. The densities and the appearance of the foamed products are listed in Table 6.

TABLE 6

| Composition (part) | | | Foamed product | |
|---|---|---|---|---|
| Polypropylene | Polybutadiene | Azodicarbonamide | Density (g./cm.$^3$) | Appearance |
| 100 | 0 | 5 | 0.43 | Large voids. No outside shell. |
| 99 | 1 | 5 | 0.25 | Slight void formation. |
| 97 | 3 | 5 | 0.17 | |
| 95 | 5 | 5 | 0.15 | Independent cells of polyhedral shape. Hard outside shell. |
| 90 | 10 | 5 | 0.14 | |

When polybutadiene was not added, a foamed product of independent cells could not be obtained. On the contrary, even the slight addition of polybutadiene could afford molded foamed products containing independent cells of polyhedral shape. The outside shell also was sufficiently hard and strong because of the polypropylene layer of about 1 mm. thickness which composed the outside.

When products containing no polybutadiene are compared with products containing 3% by weight of polybutadiene, the differences are dramatic. When no polybutadiene is added, the product contains large voids and coarse nonuniformly shaped cells. On the other hand, the product, when polybutadiene was added, contains independent cells of the approximate diameter 0.5 mm. having uniform polyhedral shape, and the product as a whole assumes a peculiar sandwich structure because the surfaces are covered with resin layers of about 1 mm. thickness.

This the addition of polybutadiene can evidently afford foamed products which are remarkably improved with respect to the uniformity of cells and the mechanical strength.

The polypropylene float prepared as above with 3% by weight of polybutadiene, a synthetic rubber float of commerce and a cross-linked polyethylene float were comparatively tested on the water pressure resistance. Namely, a water presure 25 kg./cm.$^2$ was applied to these floats in an autoclave, and after 10 minutes when the pressure was released they were taken out of the water and immediately the volume change and the increase of weight were measured, the result being shown in Table 7. The results show the superiority of the float of this invention over the conventional synthetic rubber float and a cross-linked polyethylene float.

TABLE 7

|  | Float of this invention | Synthetic rubber float | Cross-linked polyethylene float |
| --- | --- | --- | --- |
| Volume change (percent) | 11 | 19 | 15 |
| Increase of weight (percent) | 5 | 48 | 10 |

EXAMPLE 9

A mixture consisting of 80 parts of polypropylene (melt index 1.3), 20 parts of polybutadiene and 5 parts of azodicarbonamide was milled for about 30 minutes with a roll mill of a surface temperature of 155–165° C., and a sheet was prepared from the mixture. Pellets were made from the sheet and, as described in the Example 6, foamed products were obtained from them. The overall density and the density of the inner material were 0.15 and 0.098 g./cm.$^3$, respectively. The hard shell of the surface layers was approximately 1 mm. thick and the surfaces were smooth owing to the well combined pellets.

The same process was applied to composition in which polyisobutylene (molecular weight about 100,000) or ethylenepropylene rubber (Mooney viscosity 30–40) was used in place of polybutadiene. The products had the density of 0.62 and 0.54 g./cm.$^3$, respectively and neither of them was sufficient in foaming.

EXAMPLE 10

A mixture consisting of 95 parts of low density polyethylene (melt index 0.5), 5 parts of polybutadiene described above and 5 parts of azodicarbonamide was milled for about 15 minutes with a roll mill of a surface temperature of 130–135° C. to produce a sheet, which was then cut into pellets. Approximate 35 g. of the pellets were packed in a metal mold for float, as used in Example 6, and heated in a steam oven for about 20 minutes at 185° C., then taken out to be cooled. The overall density of the foamed product and the density of the inner part consisting of independent cells of polyhedral shape were 0.18 and 0.09 g./cm.$^3$, respectively. The surface was covered with polyethylene layers of about 1 mm. thickness and pellet patterns were hardly observed.

EXAMPLE 11

A mixture consisting of 70 parts of low density polyethylene (melt index 4.0), 30 parts of polybutadiene described above and 5 parts of azodicarbonamide was milled and brought to foaming as in Example 10. The foamed product obtained had the density of about 0.14 g./cm.$^3$ and consisted of uniform-sized independent cells.

EXAMPLE 12

A mixture consisting of 90 parts of an ethylene-vinyl acetate copolymer (vinyl acetate content 25%, melt index 2.0), 10 parts of polybutadiene and 5 parts of azodicarbonamide was milled for about 15 minutes with a roll mill of the surface temperature about 110° C. and a sheet was prepared from it, which was then cut into flakes. About 35 g. of the flakes were placed in a metal mold for float that was used in Example 6. The closed mold was heated in a steam oven for about 15 minutes with steam of about 10 kg./cm.$^2$ pressure, and then taken out to be cooled. The foamed product, which contained independent cells of polyhedral shape and the density was 0.15 g./cm.$^3$, was very soft and elastic and the intercombination of flakes was good.

EXAMPLE 13

A mixture consisting of 90 parts of chlorosulfonated polyethylene (the chlorine content 30–40% and the sulfur content 1.2%), 10 parts of polybutadiene and 4 parts of sodium bicarbonate was milled for about 15 minutes with a roll mill of the surface temperature about 90° C. About 35 g. of the composition was packed in a metal mold used in Example 6, heated for about 20 minutes with steam of about 150° C. in a steam oven, then taken out for cooling. The foamed product having the density of 0.13 g./cm.$^3$ was soft and very elastic.

EXAMPLE 14

Polybutadiene of average molecular weight about 180,000, which consisted of 35% cis-1,4 structure and 57.5% trans-1,4 structure, was added in the amounts of 3, 5 and 10 parts to high density polyethylene (melt index 0.5) to make up to 100 parts, and 5 parts of azodicarbonamide was added to the mixture and milled. The process of milling and foaming as well was the same as in Example 6. The foamed product had the densities of 0.19, 0.16 and 0.15 g./cm.$^3$, respectively, and composed of a sandwich structure consisting of a hard outside shell and the inner structure of highly developed cells.

EXAMPLE 15

A mixture consisting of 95 parts of high density polyethylene, 5 parts of polybutadiene as used in Example 1 and 5 parts of azodicarbonamide was milled with a roll mill of the surface temperature 145° C., and pressed into a 130 x 110 x 7 mm. plank. When the plank was heated for 40 minutes at 190° C. in a hot-air circulating type thermostat sealed with nitrogen gas, a hard plank foamed product was obtained of which the density was 0.19 g./cm.$^3$.

For the sake of comparison, the product from the material which contained no polybutadiene scarcely foamed and the density was 0.63 g./cm.$^3$.

EXAMPLE 16

A mixture consisting of 95 parts of polypropylene (melt index 1.3), 5 parts of polybutadiene described above and 5 parts of azodicarbonamide was milled and molded in the same manner as in Example 15 except the temperature to be 165° C. The composition plank was placed in a metal mold of an inside dimension 400 x 300 x 14 mm. and inserted between press plates and then heated for 60 minutes at 185° C., while introducing about 5 kg./cm.$^2$ nitrogen gas into the mold vessel. After the heating the pressure was released and the vessel was allowed to cool. The foamed product of a density of 0.12 g./cm.$^3$ was as hard as wood containing uniform independent cells and can be readily cut and worked with ordinary tools.

EXAMPLE 17

About 5 kg. of a composition consisting of 95 parts of high density polyethylene (melt index 0.5) in pellets, 3 parts of azodicarbonamide and 5 parts of polybutadiene which was cut into about 5–10 mm. pieces was placed in a vessel and mixed thoroughly. The mixture was milled and pelletized with an extruder in which $L/D=20$ and the cylinder diameter 1½ inch. The temperature at the time of extruding was 120° C. at the hopper and 150° C.

at the milling part and the head. The pellet composition in the amounts of 50, 60, 70 and 80 g. was placed in a metal mold of an inner volume of about 240 cc. and heated with steam at about 190° C. for 20 minutes and then taken out. The foamed products obtained were pure white and had foam matters of which the densities were 0.25, 0.28, 0.31 and 0.35 g./cm.$^3$, respectively. The inner materials were all well foamed and the densities were 0.2–0.25 g./cm.$^3$.

EXAMPLE 18

The composition prepared in Example 17 in the form of pellets was treated to foam successively by extruding with a screw extruder of which $L/D=20$ and the cylinder diameter 1½ inch. The temperature at the cylinder was set as in Example 17, and the outlet of the die dimension was 3 x 40 mm. of which the temperature was maintained at 180° C. The rate of extruding was 0.1 kg./min. The obtained foamed product was white colored and contained independent cells, the density being 0.29 g./cm.$^3$.

EXAMPLE 19

About 200 g. of a composition consisting of 93 parts of polypropylene (melt index 0.5, density of 0.90 g./cm.$^3$), 7 parts of polybutadiene and 2.5 parts of dinitrosopentamethylenetetramine was milled for about 10 minutes with an open roll mill of the surface temperature about 165° C. This material was immediately packed in a preheated tapered metal mold of the 267 cm.$^3$ capacity and of a plank-shape of 15 mm. thickness, and heated for 10 minutes under the pressure of a press heated at 200° C. After the predetermined heating period, the press was opened quickly to release the pressure. The foamed product of the density 0.19 g./cm.$^3$ contained uniformly dispersed tiny and independent cells.

EXAMPLE 20

About 300 g. of a composition consisting of 85 parts of polypropylene (melt index 4.0), 15 parts of polybutadiene and 6 parts of azodicarbonamide was milled with an open roll mill of a surface temperature 162° C., and then brought into a plank of 10 mm. thickness with a hot press. The plank was placed in an autoclave to be heated for 30 minutes at 200° C. in an atmosphere of nitrogen at a pressure of about 10 kg./cm.$^2$. After the treatment the product was cooled with the pressure applied and then taken out. Then it was heated for 20 minutes in a hot-air thermostat at about 180° C. The product was a hard foamed material of the density of 0.13 g./cm.$^3$ containing uniformly dispersed polyhedral cells.

EXAMPLE 21

A composition consisting of 97 parts of isotactic polypropylene (melt index 0.5) and 3 parts of polybutadiene (over 98% of cis-1,4 structure, and Mooney viscosity 35–48) was milled for 10 minutes with an open roll mill of the surface temperature about 165° C., and then made into a sheet, which was subsequently crushed with a pelletizer. The pellets of the composition were supplied to an extruder of 1½ inch, and 1,2-dichlorotetrafluoroethane was injected thereto quantitatively through a hole provided at the center of the cylinder with a pressure pump in the proportion of 10 parts to 100 parts of the composition. The temperature at the cylinder of the extruder was 175° C. and at the die having a hole of 4 mm. diameter 160° C., and the screw rotated at the rate of 15 r.p.m. The process of foaming by extrusion was conducted continuously. The foamed product of the density 0.11 g./cm.$^3$ contained independent cells of average cell size 0.5 mm. having a uniformly dispersed polyhedral structure.

For comparison, the extrusion foaming was applied under the same conditions as above to a composition which contained no polybutadiene. The product obtained was a foamed matter of the density 0.5 g./cm.$^3$ which contained cells of the average diameter of about 1 mm. and large voids.

EXAMPLE 22

A composition consisting of 95 parts of high density polyethylene (density 0.96 g./cm.$^3$ and melt index 0.5) and 5 parts of polybutadiene was mixed with a Banbury's mixer and then pelletized. The process of foaming by continuous extrusion was followed while the pellets were being supplied to a 1½ inch extruder and at the same time 20 parts of dichlorodifluoromethane being injected with a quantitative pump through a hole at the cylinder of the extruder. The temperature at the cylinder was 160° C. and at the die 140° C.

The foamed product obtained of the density 0.03 g./cm.$^3$ contained independent cells of an average diameter of 1 mm. and of uniformly dispersed polyhedral structure.

EXAMPLE 23

A composition consisting of 91 parts of low density polyethylene (the density 0.92 g./cm.$^3$ and the melt index 1.0) and 9 parts of polybutadiene was milled with an open roll mill of a surface temperature of 120° C. and then made into pellets. The process of extrusion was performed with the pellets, in which the pellets were supplied to a 1½ inch extruder, of which the temperature was set at 135° C. at the cylinder and at 115° C. at the die, and 20 parts of dichlorotetrafluoroethane together with one part of water for 100 parts of the resin composition was injected with a quantitative pump through a hole provided at the cylinder. The foamed product of a density of 0.04 g./cm.$^3$ contained cells of the average diameter of 0.03 mm. having uniformly dispersed polyhedral shapes.

EXAMPLE 24

To pellets prepared from a composition consisting of 80 parts of low density polyethylene (melt index 1.0) and 20 parts of polybutadiene, 4 parts of 1,2-dichlorotetrafluoroethane as foaming agent was applied under pressure with an autoclave. The resulting material was supplied to a hopper of a screw-in-line type injection machine of the screw diameter 42 mm., so that 60 g. of the composition was extruded in 1 second injection time into disk-type metal mold of 240 cm.$^3$ capacity. The temperatures were 80° C. at the metal mold, 150° C. at the first zone of cylinder (close to the hopper), 150° C. at the second zone and 180° C. at the third zone.

The foamed product contained uniform, tiny and independent cells and the density was 0.25 g./cm.$^3$.

EXAMPLE 25

A composition consisting of 90 parts of high density polyethylene (density 0.960 g./cm.$^3$ and melt index 6) and 10 parts of polybutadiene was thoroughly mixed with an open roll mill and was made into pellets. To 100 parts of this mixture, 10 parts of diatomaceous earth to which 10% by weight of water has been added to be homogeneously dispersed was mixed thoroughly with a ribbon blender. The resulting material was supplied to an extruder of the screw diameter 40 mm., $L/D=20$ and the ratio of compression 3,2 through the hopper. The temperatures at the three portions of barrel of the extruder were set at 90, 170 and 190°C. successively from the closest one to the hopper. The composition was extruded in the form of a sheet from a T-type die at 140° C. at the rate of 7 kg. per hour, while at the same time propane gas as foaming agent was blown into the cylinder at the rate of 680 g. per hour with a high pressure quantitative pump at the pressure of 100–150 kg./cm.$^2$ at the position 200 mm. from the entrance of the barrel of the extruder toward the outlet. Expansion by foaming of the composition at the outlet of the die gave a foamed polyethylene product in the form of a sheet. The foamed polyethylene product of the density 0.035 g./cm.$^3$ was of good quality because of being soft and containing uniformly dispersed cells.

What is claimed is:
1. Process for preparing non-cross linked polymer foams, comprising heating and foaming a composition comprising 99.5–70% by weight of an olefin polymer, 0.5–30% by weight of polybutadiene having a cis-content of at least 35%, and a foaming agent, the total of the olefin polymer and the polybutadiene being 100% by weight.

2. Process for preparing non-cross linked polymer foams according to claim 1 in which the olefin polymer is at least one member selected from the group consisting of high density polyethylene, low density polyethylene, ethylenevinyl acetate copolymer, ethylene-acrylate copolymer, ethylene-acrylic acid copolymer, ethylene-propylene copolymer, ethylene-butene copolymer, chlorinated polyethylene, chlorosulfonated polyethylene, polypropylene, polypropylene copolymer, chlorinated polypropylene, polybutene and copolymers thereof, ionomers with ethylene or propylene as the major constituent and poly-4-methylpentene-1.

3. Process for preparing non-cross linked polymer foams according to claim 1 in which one or more of polybutadiene or butadiene copolymers of less than 10% copolymerization rate are used as the polybutadiene.

4. Process for preparing non-cross linked polymer foams according to claim 1 in which the polybutadiene is used in an amount of 1.0–10% by weight of the total of the polyolefin and the polybutadiene.

5. Process for preparing non-cross linked polymer foams according to claim 1 in which the foaming agent is at least one member selected from the group consisting of decomposing types of organic and inorganic foaming agents, volatile organic foaming agents and inert gases.

6. Process for preparing non-linked polymer foams according to claim 1 in which water is added in an amount of 0.3–3% by weight of the polymer.

7. Process for preparing non-cross linked polymer foams according to claim 1 in which a material selected from the group consisting of zinc stearate, aluminum stearate, calcium silicate, calcium carbonate, zinc oxide, talc, titanium white, silicates, and diatomaceous earth are added as a foaming nucleus and a reinforcing agent selected from the group consisting of carbon black and glass fiber is added.

8. Process for preparing non-cross linked polymer foams according to claim 1 in which one of the following foaming methods is employed:

(a) extrusion foaming
(b) injection foaming
(c) blow foaming
(d) foaming with heating at normal temperature
(e) foaming with heating under pressure followed by releasing pressure and expanding, and
(f) foaming and expanding in a mold closable but not air-tight.

9. Process for preparing non-cross linked polymer foams according to claim 1 in which the foaming is done at a temperature 20 to 120° C. higher than the melting point of the olefin-polymer.

10. Foamable olefin polymer composition for obtaining non-cross linked foams comprising 99.5–70% by weight of an olefin polymer, 0.5–30% by weight of polybutadiene having a cis-content of at least 35% or a butadiene copolymer having a cis-content of at least 35% wherein the comonomer is present in an amount of less than 10%, the total of the olefin polymer and polybutadiene or butadiene copolymer being 100% by weight.

11. Non-cross linked foamed articles comprising 99.5–70% by weight of an olefin polymer and 0.3–30% by weight of a polybutadiene having a cis-content of at least 35% or butadiene copolymer having a cis-content of at least 35% wherein the comonomer is present in an amount of less than 10%.

12. Non-cross linked foamed articles having an outer skin comprising 99.5–70% by weight of an olefin polymer and 0.3–30% by weight of polybutadiene having a cis-content of at least 35% or butadiene copolymer having a cis-content of at least 35% wherein the comonomer is present in an amount of less than 10%.

13. Process according to claim 1 wherein the olefin polymer is a polyolefin.

14. Process according to claim 13 wherein the polyolefin is high density polyethylene.

15. Process according to claim 13 wherein the polyolefin is low density polyethylene.

16. Process according to claim 13 wherein the polyolefin is polypropylene.

17. Foamable olefin polymer composition according to claim 10 wherein the olefin-polymer is at least one member selected from the group consisting of high density polyethylene, low density polyethylene, ethylene-vinyl acetate copolymer, ethylene-acrylate copolymer, ethylene-acrylic acid copolymer, ethylene-propylene copolymer, ethylene-butene copolymer, chlorinated polyethylene, chlorosulfonated polyethylene, polypropylene, polypropylene copolymer, chlorinated polypropylene, polybutene and copolymers thereof, ionomers with ethylene or propylene as the major constituent and poly-4-methylpentene-1.

18. Foamable olefin-polymer composition according to claim 10 wherein the olefin-polymer is a polyolefin.

19. Foamable olefin-polymer composition according to claim 18 wherein the polyolefin is high density polyethylene.

20. Foamable olefin-polymer composition according to claim 18 wherein the polyolefin is a low density polyethylene.

21. Foamable olefin-polymer composition according to claim 18 wherein the polyolefin is polypropylene.

22. Non-cross linked foamed articles according to claim 11 wherein the olefin-polymer is at least one member selected from the group consisting of high density polyethylene, low density polyethylene, ethylenevinyl acetate copolymer, ethylene-acrylate copolymer, ethylene-acrylic acid copolymer, ethylene-propylene copolymer, ethylene-butene copolymer, chlorinated polyethylene, chlorosulfonated polyethylene, polypropylene, polypropylene copolymer, chlorinated polypropylene, polybutene and copolymers thereof, ionomers with ethylene or propylene as the major constituent and poly - 4 - methylpentene-1.

23. Non-cross linked foamed articles according to claim 11 wherein the olefin-polymer is a polyolefin.

24. Non-cross linked foamed articles according to claim 12 wherein the olefin-polymer is at least one member selected from the group consisting of high density polyethylene, low density polyethylene, ethylenevinyl acetate copolymer, ethylene-acrylate copolymer, ethylene-acrylic acid copolymer, ethylene-propylene copolymer, ethylene-butene copolymer, chlorinated polyethylene, chlorosulfonated polyethylene, polypropylene copolymer, chlorinated polypropylene, polybutene and copolymers thereof, ionomers with ethylene or propylene as the major constituent and poly - 4 - methylpentene-1.

25. Non-cross linked articles according to claim 12 wherein the olefin polymer is a polyolefin.

References Cited

UNITED STATES PATENTS

| | | | |
|---|---|---|---|
| 3,240,727 | 3/1966 | Scalari et al. | 260—2.5 |
| 3,475,354 | 10/1969 | Needham et al. | 260—2.5 |

FOREIGN PATENTS

| | | | |
|---|---|---|---|
| 999,827 | 7/1965 | Great Britain | 260—889 |

MURRY TILLMAN, Primary Examiner

W. J. BRIGGS, SR., Assistant Examiner

U.S. Cl. X.R.

260—2.5 E, 2.5 H, 33.8 UA, 889